Oct. 23, 1962     T. R. SCHMIDT     3,060,377
PIPE INSPECTION DEVICE
Filed Dec. 8, 1958     3 Sheets-Sheet 1

INVENTOR:
THOMAS R. SCHMIDT
BY: *James Todorovic*
HIS ATTORNEY

Oct. 23, 1962     T. R. SCHMIDT     3,060,377
PIPE INSPECTION DEVICE

Filed Dec. 8, 1958                                 3 Sheets-Sheet 2

INVENTOR:
THOMAS R. SCHMIDT
BY: *James Todorovic*
HIS ATTORNEY

Oct. 23, 1962 T. R. SCHMIDT 3,060,377
PIPE INSPECTION DEVICE
Filed Dec. 8, 1958 3 Sheets-Sheet 3
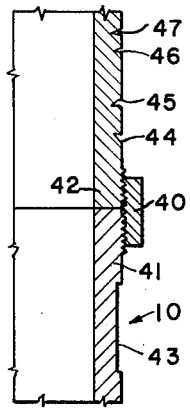
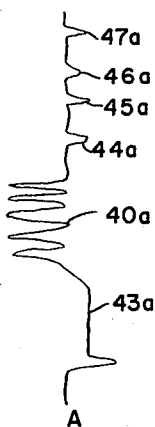
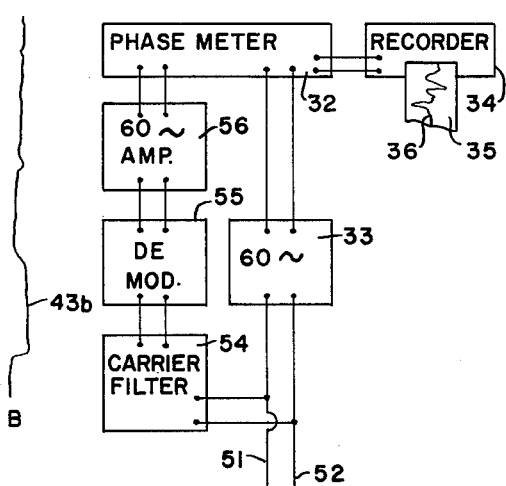
FIG. 8
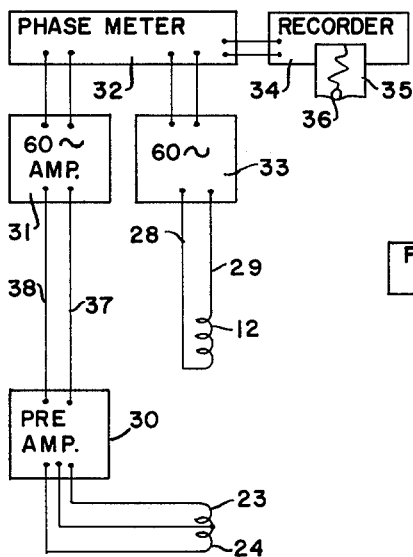
FIG. 9
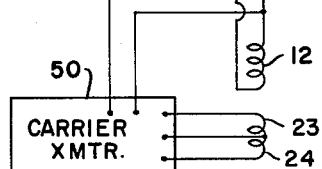
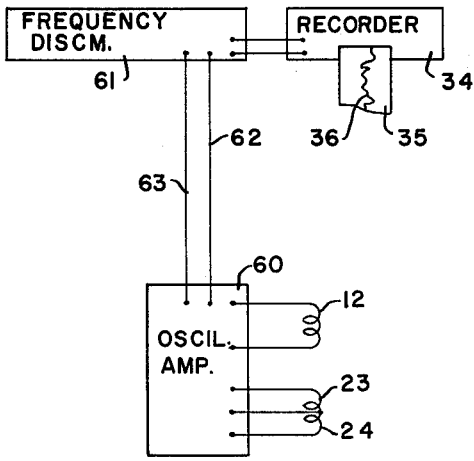
FIG. 10
FIG. 11
INVENTOR:
THOMAS R. SCHMIDT
BY: *James Todorovic*
HIS ATTORNEY

United States Patent Office 3,060,377
Patented Oct. 23, 1962

3,060,377
PIPE INSPECTION DEVICE
Thomas R. Schmidt, Lafayette, Calif., assignor to Shell Oil Company, a corporation of Delaware
Filed Dec. 8, 1958, Ser. No. 778,801
7 Claims. (Cl. 324—37)

This invention relates to an apparatus for detecting and recording flaws, irregularities and other defects in materials capable of conducting an electric current or magnetic flux, and pertains more specifically to detecting and recording flaws in metal pipes which are accessible from the inside but not necessarily from the outside.

In one of its embodiments, the invention is directed to an apparatus capable of indicating and recording not only the major changes in thicknesses of ferrous metal tubular elements, such as boiler tubes, condenser tubes, or oil well casings, but also the location and extent of flaws, pitting, and like minor defects, which may have been caused by stresses, corrosion, and the like. The necessity for making such measurements arises particularly in the case of pipes or casings buried in the ground, as for example oil well casings or various types of pipelines and other similar structures where the inside is easily accessible while access to the outside is usually impossible. The necessity of making these measurements is essential in order to anticipate ruptures and other breaks of such metal tubular elements, which breaks usually if not always, result in loss of fluid or even total loss of a well, as in the case of a casing rupture and collapse. An early determination and location of pits, flaws and other small indentations in the pipe wall, which defects are frequently caused by anodic corrosion, will permit one to treat the defects to inhibit further corrosion, and thus prevent the detrimental and frequently economically dangerous pipe failures.

A testing device has been previously designed to test variations in thickness of a wall of a metal tubular element, such as pipe and the like. This device includes a primary coil excited with alternating current and a secondary coil disposed a certain distance away from the primary coil, both of these coils being arranged so that the device containing them can be passed through the interior of the pipe. In this device, in order to permit the measurement of wall thickness, the primary and secondary coils are spaced apart by a considerable distance so as to decrease by a very large factor the amount of coupling obtained between the two coils, this spacing being such that the magnitude and phase of the voltage induced in the secondary coil bear simple theoretical relationships to the wall thickness; the magnitude varying essentially as a negative exponential function of the average thickness of the tubular member between the coils, while the phase of said induced voltage varies substantially linearly as said average thickness. Thus, either one of these two polar coordinates of the induced voltage, i.e., magnitude or phase, may be used as a measure of the average wall thickness.

This known device, however, is substantially insensitive to small flaws or pits, or other small indentations which exist or are formed in the walls of tubular metal members and which are usually caused by corrosion.

It is therefore the main object of the present invention to obviate the above and other defects of the prior art devices.

It is another object of the present invention to provide a device capable of determining, indicating, and/or recording not only major changes in the average thickness of the walls of metallic tubular objects, as for example pipes, but which will also be capable of indicating the existence, position, and even magnitude of minor irregularities, such as pits, flaws, and other minor indentations.

It has now been discovered that the above and other objectives may be attained by providing a probing device which includes three coils, one of which is a driving coil supplied with an alternating current while the other two coils form the detector assembly and are spaced away from the driver coil a distance sufficient to substantially reduce the direct coupling between the driving coil and the detector coil. These coils forming the detector assembly are disposed adjacent to each other, have coil factors of different magnitudes, and are connected to each other in electrical opposition. The separate coils which, as indicated, are adjacent to each other, are nevertheless spaced a slight distance from each other either axially, radially, or a combination of axially and radially.

While the apparatus of this invention is capable of detecting flaws in any tubular metallic element it is particularly useful for detecting flaws in ferrous metal members. The problem of detecting flaws in non-ferrous metals is much easier than ferrous metal because of their non-magnetic character.

The above objects and other advantages will be more easily understood by those skilled in the art from the following description of preferred embodiments when taken in conjunction with the attached drawings in which:

FIGURES 1A-3A are the resulting voltage vector diagrams for each position shown in FIGURES 1-3;

FIGURE 8 is a longitudinal section of a tubular member having certain known defects and the response curve from a probe constructed according to this invention and a response curve of the probe of the prior device;

FIGURE 9 is a block diagram of a circuit for operating the probe of this invention;

FIGURE 10 is a block diagram of a second circuit for operating the probe of this invention; and FIGURE 11 is a block diagram of a third circuit for operating the probe of this invention.

This invention results from the discovery that the response of a magnetic detecting apparatus to minor flaws in a tubular member can be increased by forming the detector assembly from two separate coils having different coil factors. The two separate coils of the detector assembly are connected in electrical opposition and are spaced from each other either axially or radially. In order to more fully understand the results achieved by using two spaced coils connected in electrical opposition to form the detector assembly, reference is now made to FIGURES 1, 2, 3, and FIGURES 1A, 2A, and 3A. All of these figures show a probe member having a driving coil D and a detector assembly formed by two coils S1 and S2. As shown, the coils S1 and S2 are axially spaced and in addition connected in electrical opposition. The probe is positioned in a tubular member 110 having a thin wall section 114 and shoulder 115 between the thin wall section and the remainder of the tubular member.

Figure 1:
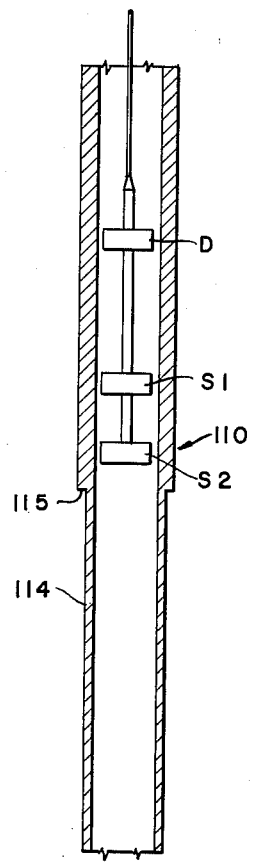
FIGURES 1-3 are schematic diagrams showing the probe of this invention in three positions in a tubular member.

Referring now to FIGURE 1, the probe is shown positioned in the tubular member with both coils S1 and S2 in the thick wall section of the tubular member. It is assumed that coil S1 has a smaller coil factor than coil S2. As shown in the vector diagram of FIGURE 1A when the drive coil D is energized by a voltage represented by vector $V_D$ it will induce a voltage in coil S1 represented by vector $V_{s1}$ and a voltage in coil S2 represented by vector $V_{s2}$. Since coils S1 and S2 are adjacent and are in electrical opposition the vectors $V_{s1}$ and $V_{s2}$ are practically 180 degrees from each other, and $V_{s1}$ is subtracted from $V_{s2}$ resulting in an effective vector V1 which has substantially the same phase angle as vector $V_{s2}$. Of course, the voltage induced in coil S2 will always have a greater magnitude than the voltage in coil S1 since coil S2 has the larger coil factor.

Figure 2:
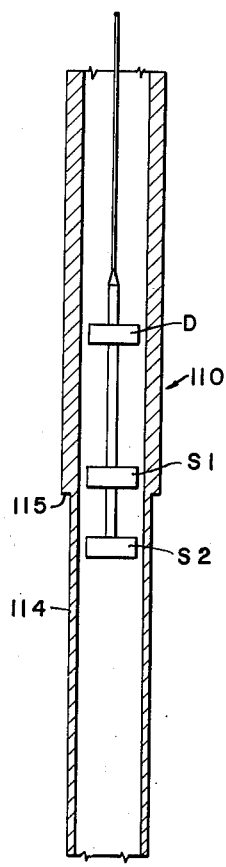
Figure 3:
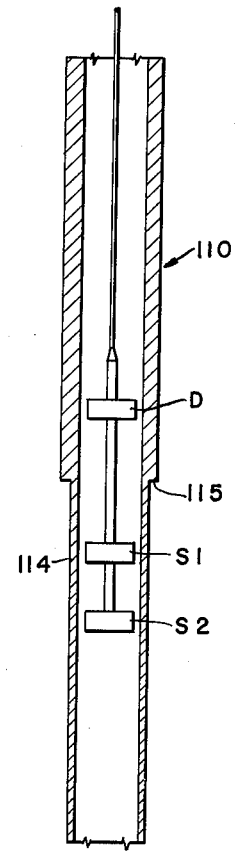
Figure 1A:
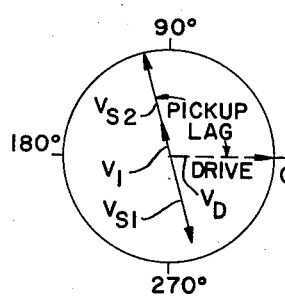
Figure 2A:
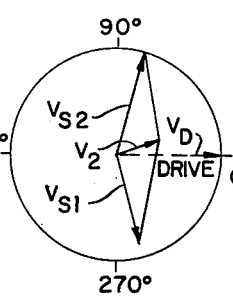

Referring now to FIGURE 2, the probe is shown positioned with the two coils S1 and S2 straddling the shoulder 115, coil S1 remaining in the thick wall section of the tubular member and coil S2 having passed into the thin wall section 114. In this position the phase of the vector representing the voltage induced in coil S1 will remain the same as in FIGURE 1A while the phase of the vector for the voltage induced in coil S2 will shift as shown in FIGURE 2A. The vector V2 for the resultant voltage will have a considerable phase shift from the resultant vector V1 of FIGURE 1A and an increased magnitude. If one uses phase detection of the resultant vector as a means for indicating defects a very sensitive detection means is provided due to the large phase shift of the resultant vector.

Figure 3A:
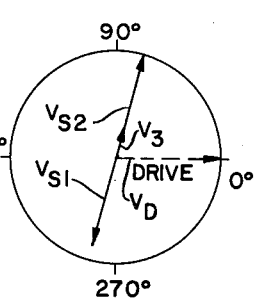

FIGURE 3A shows the vector diagram when both coils S1 and S2 are positioned in the thin wall section 114 of the tube. In this position the vectors $V_{s1}$ and $V_{s2}$ are again in opposition to each other and the resultant vector V3 is aligned with vector $V_{s2}$.

While the above description relates to the case where the two coils S1 and S2 pass over the shoulder 115 the same result is obtained when the coils pass over a small pit or hole. This can easily be seen when one considers that only one coil will pass over the pit or hole at a time. The vector for the coil passing over the defect will be shifted in phase while the other vector will remain in its former position, thus resulting in a vector diagram similar to that shown in FIGURE 2A.

The above results cannot be achieved with the probe member of the prior device since it uses only a single coil to form the detector assembly. While the phase angle of the induced voltage vector for this coil shifts as it passes over a pit or hole the shift is small and the remainder of the apparatus cannot be made sensitive enough to detect it.

Figure 4:
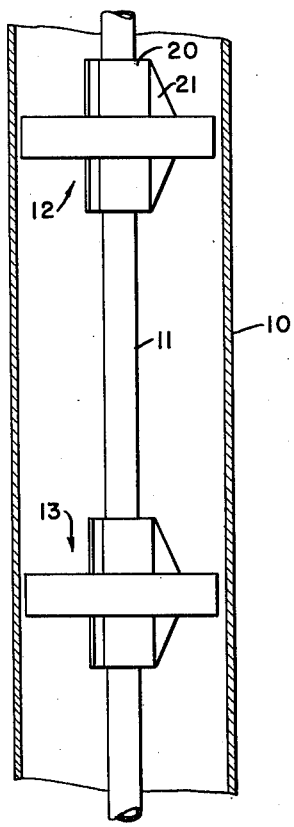
FIGURE 4 is a longitudinal section of a tubular member showing the probe member of this invention positioned therein with the probe shown in elevation.
Figure 5:
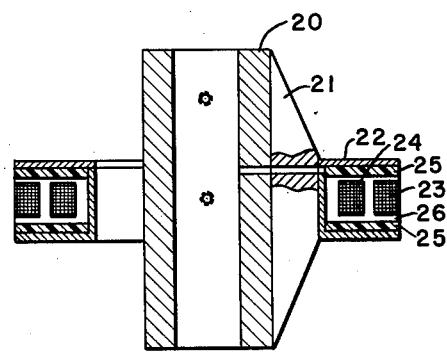
FIGURE 5 is an enlarged section of the detecting assembly of the probe shown in FIGURE 4.

Referring now to FIGURES 4 and 5, there is shown a representative tubular member 10 with a probe constructed according to the teachings of this invention positioned therein. The probe is provided with a tubular supporting member 11 on which the driver coil 12 and the detector assembly 13 is mounted. It should be noted that the detector assembly is spaced a substantial distance from the driver coil and in any case at least a distance equal to the inner diameter of the tubular member 10. The construction of both the driver and detector coils is substantially the same and only the actual construction of the coils forming the detector assembly is shown in FIGURE 5. Both the driver and detector coils are provided with a tubular coil support member 20 which has three coil spacers or webs 21 attached to its outer surface by any desired means such as welding or the like. The coil spacers are flat plate members which project radially from the outer surface of the tubular support member 20. A coil holder 22 having a U-shaped or channel-shaped cross section is attached to the outer edges of the coil spacers 21 by fastening the bite portion of the U to the outer edge of the spacers 21 by welding or the like. Two coils 23 and 24 are disposed in the coil holder 22 of the detector coil and are wound about a suitable coil form 26. Insulating members 25 are positioned on each side of the coils in order to insulate the coils from the coil holder. It should be noted that the coil 23 is wound about the outer diameter of the coil 24.

The two coils 23 and 24 should be wound to obtain substantially balanced characteristics, which means that coil 24 should have more turns than coil 23 if the same size wire is used for both coils. An exact balancing of the two coils is difficult to achieve in actual practice and thus the magnitude of the voltage vector from one coil will exceed the magnitude of the voltage vector from the other coil. Of course, as explained above with reference to FIGURES 1 to 3, it is necessary that the coils produce voltage vectors having different magnitudes. This can be accomplished by assembling the probe member and checking the magnitude of the voltage vectors, if they are not sufficiently different to provide a detectable signal a few turns can be removed from one coil to vary the magnitude of its voltage vector. The reverse procedure may be used to bring the coils into closer balance if the difference in the magnitude of their voltage vectors is too great.

Figures 6, 7:
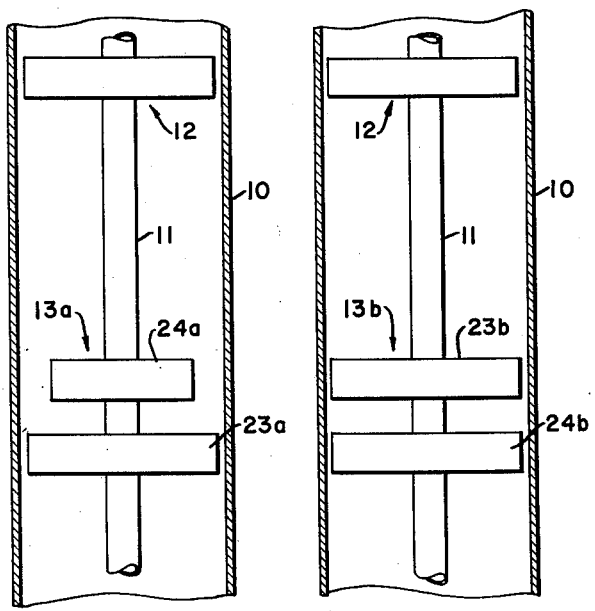
FIGURE 6 is a schematic drawing showing a second embodiment of the probe of this invention.
FIGURE 7 is a schematic drawing showing a third embodiment of the probe of this invention.

Referring now to FIGURE 6, there is shown a schematic drawing of a second embodiment of the probe of this invention in which the inner or smaller coil 24a of the detector coil assembly 13a is mounted on the tubular support 11 closer to the driver coil 12 than the larger or outer coils 23a.

FIGURE 7 illustrates another embodiment of the probe of this invention in which the two coils 23b and 24b forming the detector coil assembly again have different coil factors. The difference in coil factors between the coils 23b and 24b may be obtained by using a different number of turns on the two coils or different size wire or both. This embodiment is substantially the same as that shown in FIGURES 1–3 and described above. In all of the embodiments the effective center of the detector coil assembly is placed a distance of at least one diameter of the tubular member from the driving coil.

Referring to FIGURE 9, there is shown a circuit means for detecting the phase difference between the alternating current supplied to the driver coil 12 and the alternating output signal from the detector assembly 13. In the apparatus shown the driving coil 12 is connected to a source 33 of a 60-cycle alternating current by means of leads 28 and 29, while a 60-cycle source is shown the system, of course, will operate over a large range of frequencies. The alternating current in the driving coil 12 induces two voltages in the detector assembly 13 one of these voltages being due to the coil 23, the other due to the coil 24. The two separate coils 23 and 24 which form the detector assembly 13 are connected in electrical opposition in order that the voltage induced in the two coils will be vectorially added to supply a single output voltage from the detector assembly. The output from the detector assembly 13 is supplied to a preamplifier 30, the preamplifier 30 in turn is coupled to a second amplifier 31 by means of leads 37 and 38 with the output of the second amplifier being coupled to a phase meter 32. The 60-cycle alternating current supplied to the driving coil 12 is also supplied to the phase meter 32 in order that the phase meter 32 may detect the actual phase difference between the input voltage to the driving coil 12 and the single output voltage from the detector assembly 13. The output signal of phase meter 32 is coupled to a recorder 34 which provides a continuous record 36 on a chart 35 of the magnitude of the phase difference between the input and output voltages in the probe.

Referring now to FIGURE 8, there is shown on the left a section of a tubular member having certain faults of known character and on the right two curves or chart records A and B. The chart record A is a record of the response of an apparatus constructed in accordance with this invention to the faults shown in the tubular member of FIGURE 8 while the chart B is a chart of the response of the prior device to the faults in the tubular member in FIGURE 8. From an inspection of the two charts it will be noted that both probes have substantially the same response to the thinned wall section 43 but that the probe of the prior device has substantially no response to the small pits and holes 44, 45, 46, and 47 while the probe of this invention has considerable response to these pits and holes as shown by the response 44a, 45a, 46a, and 47a on the chart A. As explained above, one of the coils 23 or 24 will be affected by the disturbed field caused by the defect while the other coil will remain relatively unaffected. This will cause a shift in the phase angle of the voltage vector of this coil which in turn will be amplified by the affect shown and described in FIGURES 1–3. While the description and FIGURES 1–3 relate to a probe in which the two coils forming the detector coil assembly are axially spaced from each other as well as the driver coil the same results can be obtained by using the coil arrangement shown in FIGURES 4 and 5. This can be explained by the fact that the inner coil 24 shown in FIGURE 5 is substantially unaffected by a pit of flaw while the coil 23 is affected. This again gives a result similar to that shown in FIGURE 2 since the inner coil acts as a reference for the average wall thickness while the outer coil responds to small pits and flaws in addition to the average wall thickness.

Referring to FIGURE 10, there is shown a second circuit for transmitting the voltage signal from the detector assembly 13 to the phase meter and recorder. In the circuit shown in FIGURE 10 only a single conductor cable with a ground lead is necessary for connecting both the power supply to the driving coil 12 and the output voltage from the detector assembly 13 to the remainder of the circuit. This arrangement is especially advantageous when the probe is to be lowered into a deep oil well or the like since a single conductor cable with a ground wire is much cheaper to construct and much easier to handle than a multiple conductor cable such as would be required for the circuit shown in FIGURE 9. The main difference between the circuit shown in FIGURE 9 and the circuit in FIGURE 10 is that a carrier signal is used for transmitting the voltage signal from the detector assembly 13 to the remainder of the circuit. This permits one to transmit a 60-cycle power signal down the signal conductor cable over the leads 51 and 52 to the driver coil 12 and then transmit the voltage signal from the detector assembly 13 to the surface over the same leads 51 and 52. In order to accomplish this result, it is necessary to incorporate a transmitter directly in the probe member which is lowered into the well. The transmitter oscillator should be capable of generating a carrier signal having a substantially different frequency than the 60-cycle power supply and then modulating the carrier signal either in amplitude or frequency in response to the voltage signal from the detector assembly 13. At the surface of the well it will be necessary to use a filter 54 in order to filter the carrier frequency from the leads 51 and 52 with the filter 54 in turn being coupled to a demodulating circuit 55. The demodulating circuit 55 should be capable of removing the 60-cycle voltage signal of the detecting assembly 13 from the carrier signal and then transmitting this voltage signal to an amplifier 56. The output of the amplifier 56 is coupled to the phase meter 32 which is also supplied with the power supply voltage in order that it may determine the phase difference between the input voltage to the driver coil 12 and the output voltage from the detector assembly 13. Again a voltage which is proportional to the phase difference is recorded on the chart 35 of the recorder 34. Again the response of the circuit shown in FIGURE 10 to the flaw in the tubular member shown in FIGURE 8 is represented by the chart A of FIGURE 8.

A third circuit which may also be used with a probe for this invention is shown in FIGURE 11. This circuit differs from both circuits shown in FIGURES 9 and 10 in that it uses frequency discrimination in order to determine the response of the probe to flaws in a tubular member. In order to use frequency discrimination it is necessary to couple both the detector coil and the driver coil to an oscillating amplifier 60. This oscillating amplifier 60 must either be supplied with its own power supply or supplied with power over two additional leads not shown in FIGURE 11. The oscillating amplifier should be designed so that it will supply an oscillating signal to the driver coil 12 whose frequency will vary in proportion to the phase difference between the signal supplied to the driving coil 12 and the output signal from the detector assembly 13. The signal supplied to the driving coil 12 is also supplied to a frequency discriminator 61 through leads 62 and 63. The frequency discriminator is designed to supply a voltage signal to the recorder 34 with the magnitude of the signal being proportional to the frequency of the oscillator 60. Thus, the chart record will again provide a record which is an indication of the magnitude of the phase difference between the signals supplied to the driving coil 12 and the output of the signal of detector assembly 13.

From the above description it can be appreciated that this invention has provided a probe member which is sensitive not only to thin wall sections of a tubular member but also to small pits and imperfections in the wall of the tubular member. This result is obtained by providing a detector assembly having two separate coils and then connecting the output from the individual coils in electrical opposition. The separate coils are also spaced from each other either radially or axially which results in an amplification of the phase shift of the induced voltage in the detector coil as explained above. Three separate means are shown in FIGURES 4, 6, and 7 by which the two separate coils of the detector assembly may be spaced. In addition, three separate circuit means are shown in FIGURES 9, 10, and 11 for transmitting the signal from the detector assembly to the surface equipment which in turn supplies a suitable signal to a chart recorder. The chart recorder in turn plots a continuous curve whose amplitude is an indication of the faults or imperfections in the tubular member and whose length is correlated with the position of the fault on the tubular member. When the circuit is used for logging a well casing in order to determine the location of possible corrosion or thin wall sections of the well casing it is customary to print the actual depth of the probe in the well directly on the chart recorder thus the exact location of the corrosion or other imperfection can easily be determined.

Accordingly, this invention should not be restricted to the particular details shown and described above but only to its broad spirit and scope since many changes and modifications may be made therein.

I claim as my invention:

1. A probing apparatus for detecting flaw and variations in wall thickness of a metallic object and adapted for insertion into and movement through a passageway in the metallic object to be tested, which device includes a primary coil, means for supplying an alternating current to said coil, a secondary coil assembly spaced away from said primary coil a distance sufficient to cause the voltage signal induced in said secondary coil assembly by the current in said primary coil to vary essentially exponentially with the wall thickness, said secondary coil assembly consisting of two coils disposed adjacent to each other, having coil factors of different but predetermined magnitudes, and being connected to each other in electrical opposition to obtain said voltage signal equal to the vectorial difference between the signals produced in said two coils by current flow in the primary coil, and means for measuring the phase difference between the alternating current and said voltage signal.

2. In an apparatus for detecting even minor variations in the thickness of the wall of a pipe from the inside, a primary coil located coaxially within said pipe, means for supplying said primary coil with alternating current, a secondary coil assembly located coaxially in said pipe and spaced away from said primary coil a distance sufficient to cause a voltage signal induced in said secondary coil assembly by the current in said primary coil to vary essentially exponentially with the wall thickness, said coils being mounted together to form a probe, and said secondary coil assembly consisting of two coils spaced adjacent to each other, having coil factors of appreciably different magnitudes, and being connected to each other in electrical opposition to obtain said voltage signal equal to the vectorial difference between the signals produced in said two coils by current flow in the primary coil, and means for measuring the phase difference between the alternating current and said voltage signal.

3. An apparatus for detecting flaws in a tubular member comprising: a driver coil disposed within the tubular member, the plane of said driver coil being at an angle to the axis of the tubular member; a detector coil assembly having two separate coils of unequal coil factors, said separate coils being connected in electrical opposition and said detector coil assembly being disposed within said tubular member in a plane at an angle to the axis of said tubular member; a source of alternating current coupled to said driver coil and circuit means for detecting the difference in phase between said alternating current and the electrical signal induced in said detector coil assembly.

4. An apparatus for detecting flaws in a metallic member comprising: generating means including a coil for producing an electromagnetic field adjacent the member; receiving means including two spaced coils for receiving a portion of the electromagnetic field which passes through the member and converting it to separate electrical signals of unequal magnitude and different phases, said separate electrical signals being combined to obtain the vectorial difference between the separate electrical signals and circuit means for determining the phase difference between the electrical field produced by said generating means and the vectorial difference of said separate electrical signals.

5. Apparatus for detecting flaws in a tubular metallic member comprising: a probe element disposed to be inserted into the tubular member, said probe having a driving coil and a detector coil assembly spaced from said driving coil, said detector coil assembly consisting of two separate coils connected in electrical opposition; circuit means having a source of alternating current, said alternating current being coupled to said driving coil by a two conductor cable; a transmitting means for transmitting a signal over said two conductor cable; said transmitted signal having a substantially different frequency than the frequency of said alternating signal; said transmitted signal in addition being modulated in response to the signal induced in said detector coil assembly by the alternating current supplied to said driving coil; demodulating means in said circuit means for removing the transmitted signal from said cable and demodulating it to obtain the original signal induced in said detector coil assembly and phase comparing means in said circuit means for comparing the phase of the induced signal with the phase of said alternating current.

6. The apparatus of claim 4 including means operably coupled to said generating means and said receiving means for effectively eliminating direct coupling between the generating and receiving means.

7. An apparatus for detecting flaws in a metallic member comprising: generating means including a coil for producing an electromagnetic field adjacent the member; a receiving means having at least two coils spaced from the generating means a sufficient distance to substantially eliminate direct coupling between the generating means and said coils, said coils in addition receiving a portion of the electromagnetic field that passes through the member and converting it to separate electrical signals of unequal magnitudes and different phases, said separate electrical signals being combined to obtain the vectorial difference between the separate electrical signals and circuit means coupled to said generating means and said receiving means for determining the phase difference between the electrical field produced by said generating means and the vectorial difference of said separate electrical signals.

References Cited in the file of this patent

UNITED STATES PATENTS

| | | |
|---|---|---|
| 2,065,118 | Davis | Dec. 22, 1936 |
| 2,065,379 | Knerr | Dec. 22, 1936 |
| 2,124,579 | Knerr et al. | July 26, 1938 |
| 2,315,943 | De Lanty | Apr. 6, 1943 |
| 2,455,792 | Meunier | Dec. 7, 1948 |
| 2,555,853 | Irwin | June 5, 1951 |
| 2,573,137 | Greer | Oct. 30, 1951 |
| 2,573,799 | MacLean | Nov. 6, 1951 |
| 2,844,787 | McCann | July 22, 1958 |
| 2,896,155 | Cook | July 21, 1959 |